United States Patent [19]

Daido et al.

[11] Patent Number: 5,076,381
[45] Date of Patent: Dec. 31, 1991

[54] POWER STEERING APPARATUS AND ROTARY DETECTOR USED THEREFOR

[75] Inventors: Toshihiko Daido; Hirofumi Matsuoka; Hidetoshi Tabuse, all of Osaka, Japan

[73] Assignee: Mitsubishi Denki Kabushiki Kaisha, Tokyo, Japan

[21] Appl. No.: 377,385

[22] Filed: Jul. 10, 1989

[30] Foreign Application Priority Data

Jul. 11, 1988 [JP] Japan .................................. 63-173364
Aug. 25, 1988 [JP] Japan .................................. 63-212064
Feb. 17, 1989 [JP] Japan .................................... 1-38985

[51] Int. Cl.$^5$ ............................................. B62D 5/04
[52] U.S. Cl. ............................. 180/79.1; 364/424.05
[58] Field of Search ..................... 180/79.1, 141, 142; 364/424.01, 424.05; 74/388 PS

[56] References Cited

U.S. PATENT DOCUMENTS

| | | | |
|---|---|---|---|
| 4,703,819 | 11/1987 | Hosotani | 180/142 X |
| 4,753,308 | 6/1988 | Noto et al. | 180/79.1 |
| 4,830,137 | 5/1989 | Tatemoto et al. | 364/424.01 X |
| 4,837,692 | 6/1989 | Shimizu | 364/424.05 |
| 4,838,374 | 6/1989 | Walton | 180/141 X |

FOREIGN PATENT DOCUMENTS 61-215166 9/1986 Japan .
62-55265 3/1987 Japan .

*Primary Examiner*—Richard A. Bertsch
*Assistant Examiner*—Mitchell Bompey
*Attorney, Agent, or Firm*—Townsend and Townsend

[57] ABSTRACT

An electric power steering apparatus of the invention is provided with a rotary detector for detecting a rotational position of a motor, a vehicle speed sensor for detecting a vehicle speed, a torque sensor for detecting a steering torque, a calculating means for calculating angular velocity of aforesaid motor on the basis of aforesaid rotational position, and a target angular velocity setting means, wherein flow quantity of electric current to a motor for assisting steering force is made larger, when the steering torque is within a dead zone, correspondingly to the increase of the deviation on the basis of the deviation between the target angular velocity and the calculated angular velocity, thereby stabilized steering feeling in the vicinity of the steering angle middle point at the time of returning the steering wheel steered by mostly using the steering torque being in the dead zone.

And this power steering apparatus is capable of fully following up the rotation of the steering wheel as well as preventing the extreme returning of the steering wheel at the time of returning control, by subtracting subtractor current which is made small when both the steering torque and angular velocity are large, and made large when the steering torque is small and the angular velocity is large, from the driving current.

12 Claims, 17 Drawing Sheets

POWER STEERING APPARATUS AND ROTARY DETECTOR USED THEREFOR

BACKGROUND OF THE INVENTION

1. Field of the Invention

The present invention relates to an electric power steering apparatus which assists force required for steering operation with turning force of a motor and to a rotary detector for detecting rotational position of the motor, particularly to a control of driving current given to the motor when a steering wheel is returned and to improvements of construction of the rotary detector.

2. Description of Related Art

An electric power steering apparatus has been developed which provides a driver a comfortable steering feeling by driving a motor for assisting steering force on the basis of a detected result of a steering torque exerted on a steering wheel and by assisting force required for steering a vehicle with turning force of the motor.

This power steering apparatus consists of a rack shaft projected in the right and left direction of a vehicle body, the both ends thereof being connected to the right and left front wheels through each tie rod respectively, and a pinion shaft engaged with the rack shaft at the middle portion of the latter, interlockingly connected with the steering wheel.

Vehicles, provided with steering mechanism of rack-pinion system for carrying out steering operation by changing rotations of the pinion accompanying the rotational operation of the steering wheel into a movement of longitudinal direction of the rack shaft, are divided broadly into the following two categories according to the set position of the motor for assisting steering force, that is, the one wherein, the shaft of above said pinion is further projected from the engaged position with the rack shaft, aforesaid motor being provided at the projected portion through an appropriate speed reducer in order to transfer the turning force, and the other wherein, an auxiliary pinion engaged with aforesaid rack shaft is provided at a position in the axial direction different from aforesaid engaged position of the pinion, aforesaid motor being provided at aforesaid auxiliary pinion through an appropriate speed reducer in order to transfer the turning force, the former being named as one-pinion system, and the latter named two-pinion system respectively according to the number of pinions engaged with the rack shaft.

In this way, in any power steering apparatus aforementioned has a problem that the steering feeling is not natural, as the turning force of the motor for assisting steering force is transferred to the extended portion of the shaft of the pinion or the auxiliary pinion through the speed reducer, thereby, when the steering wheel is returned to the position for going straight, the returning is made to be late by the moment of inertia of the motor rotor and the frictional resistance of the speed reducer.

In order to solve the problem, there is an invention disclosed in Japanese Patent Application Laid-Open No. 61-215166, 1986. This is the one wherein the motor control is carried out by acceleration and deceleration function corresponding to the rotational speed of the motor as well as the restoring force by the motor is given to the steering wheel according to the restoring force function corresponding to the size of the steering angle.

Aforesaid invention, however, has a problem that, assist force which is an essential aim of power steering is reduced, thereby assist characteristics being interfered when speedy rotation of the motor such as quick handling is required, since the acceleration and deceleration control and returning control of the motor are carried out by using rotational speed of the motor and the steering angle, whereby plugging torque becoming large particularly in high speed rotational area. And, since the restoring force is generated so that the steering wheel is returned to neutral position correspondingly to the steering angle, thereby steering feeling is not stabilized due to the vehicle speed and inertia of the motor, leading the position of the steering wheel sometimes to exceed the neutral position, whereby causing a problem that astringency of the steering being bad in the return control of the steering wheel.

On the other hand, as the turning force of the motor for assisting steering force is transferred to the projected portion of the shaft of the pinion or the auxiliary pinion, in the case where abnormality is generated in the motor for some reason, increasing rotational resistance of the output shaft thereof, thereby locking the output shaft, there sometimes is the case that steering cannot be carried out. As the conventional power steering apparatus to prevent the problems above mentioned, the one has been well known wherein an electromagnetic clutch is provided at the output shaft of the motor, and when the ignition key is ON, the motor and the speed reducer is separated by the electromagnetic clutch, then electric current is applied to the motor momentarily, thereby detecting the lock of the motor by electromotive force generated when the motor rotates by the force of inertia.

In the conventional power steering apparatus, however, as the presence of the lock of the motor is detected by electromotive force of the motor, the detection is only carried out when the ignition key is ON, thereby, in the case where the lock occurs in the motor during the running time, there is a problem that the presence of the lock is not detected. Accordingly, since the lock of the motor cannot be detected when abnormality is generated, leading to the lock of the motor, in the case where the steering mechanism cannot be steered, the conventional apparatus is not capable of coping with the situation.

In order to detect the abnormality, it is considered to install a rotary detector for detecting the rotational condition of the motor on the motor, however, there is a problem that the tachogenerator of the conventional rotary detector is not capable of detecting the low speed rotation and rotational position, and there are also problems that a rotary encoder using a photo interrupter lacks heat resistance, deteriorates with the age, and costs high.

SUMMARY OF THE INVENTION

The invention has been devised in consideration of the circumstances. The first object of the invention is to provide a power steering apparatus which does not impair the assist characteristics even in high speed rotational area of a motor by detecting an angular velocity of the motor, and controlling the electric current which drives the motor correspondingly to the angular velocity and the steering torque.

The second object of the invention is to provide a power steering apparatus which does not exceed in returning control of the steering wheel, thereby being good in astringency of the steering by setting the returning angular velocity of the steering wheel correspondingly to the steering angle and the vehicle speed and changing the driving current supplied to the motor during the time of returning the steering wheel so that the actual angular velocity of the steering wheel agrees with aforesaid set value.

The third object of the invention is to provide a power steering apparatus which does not make the vehicle incapable of steering by detecting the lock of the motor due to the steering torque and the rotational position of the motor, and then, by separating the clutch when the lock is generated.

The above and further objects and features of the invention will more fully be apparent from the following detailed description with accompanying drawings.

DESCRIPTION OF THE PREFERRED EMBODIMENTS

Figure 1:
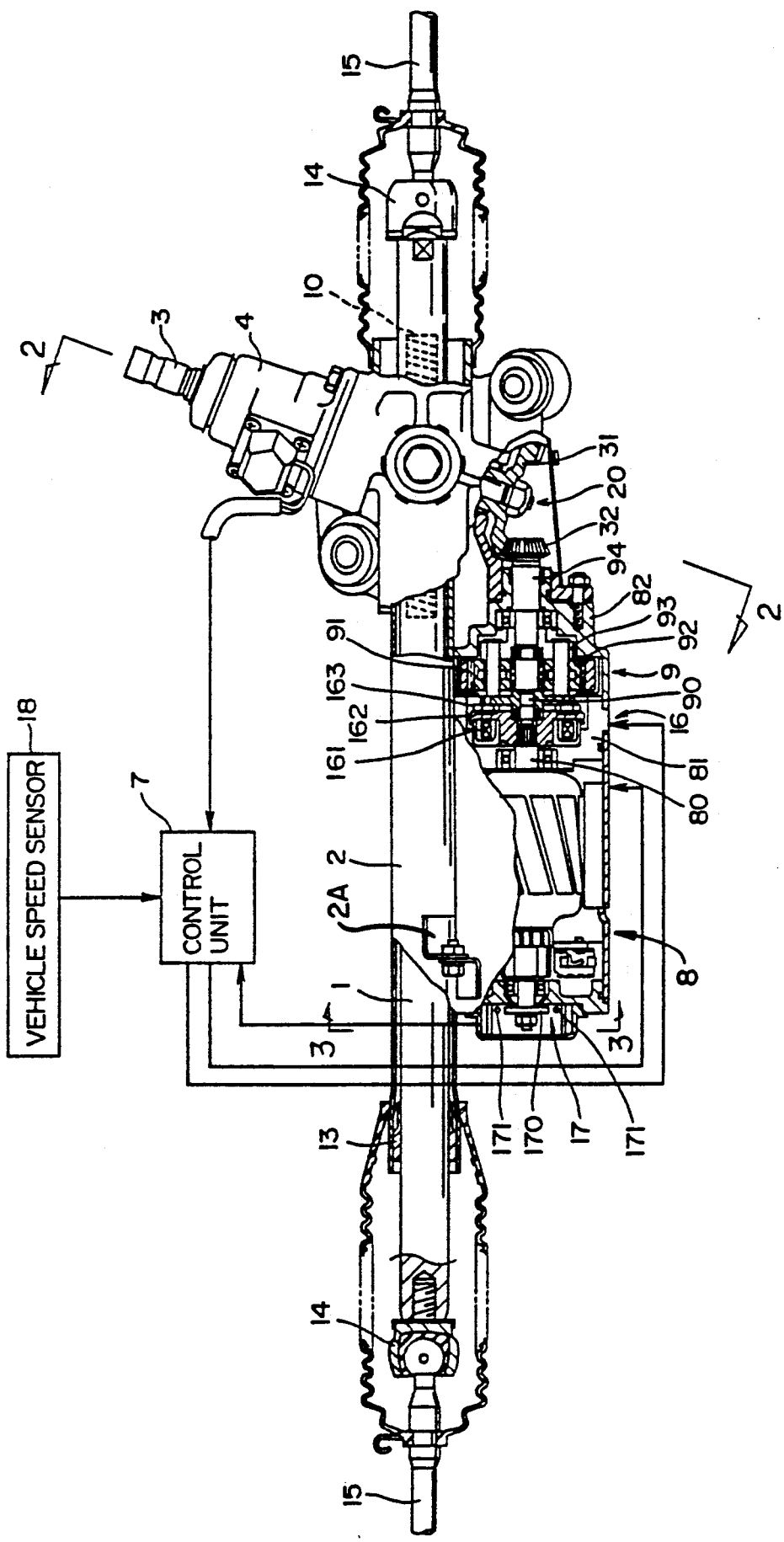
FIG. 1 is a partially broken front view showing one embodiment of a power steering apparatus according to the invention.
Figure 2:
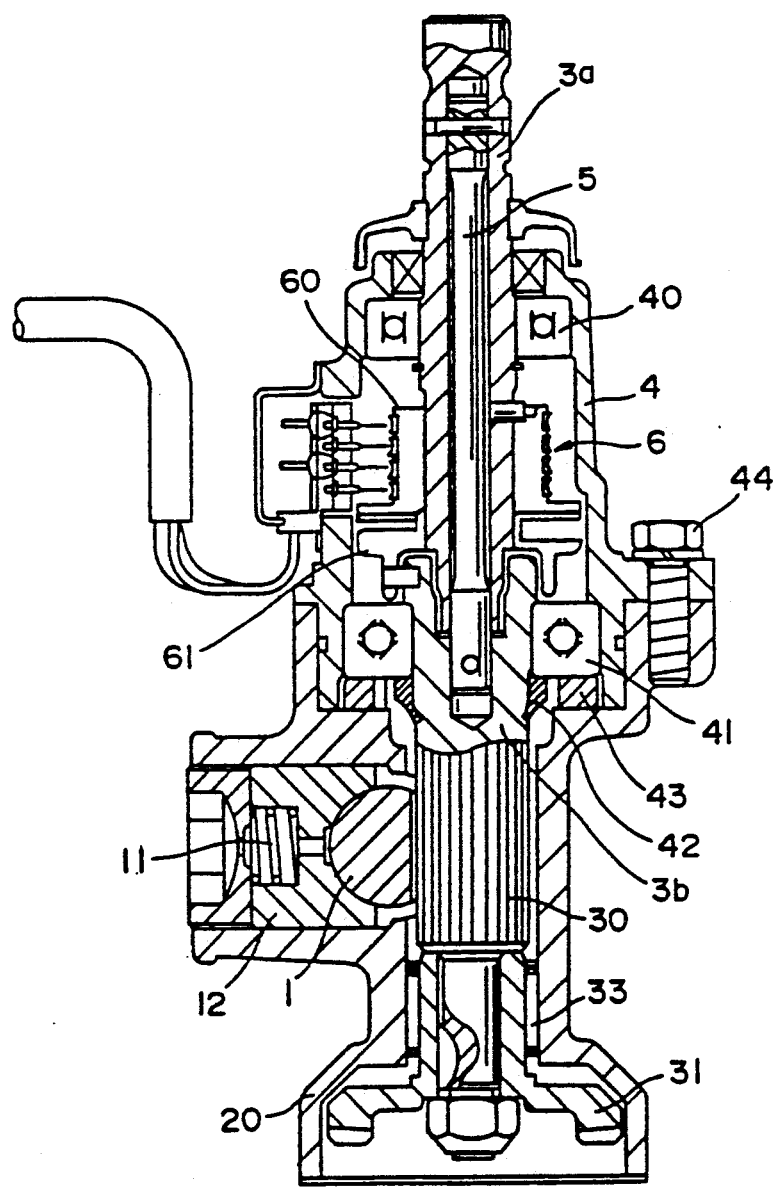
FIG. 2 is an enlarged sectional view of the embodiment along line II—II of FIG. 1.
Figure 3:
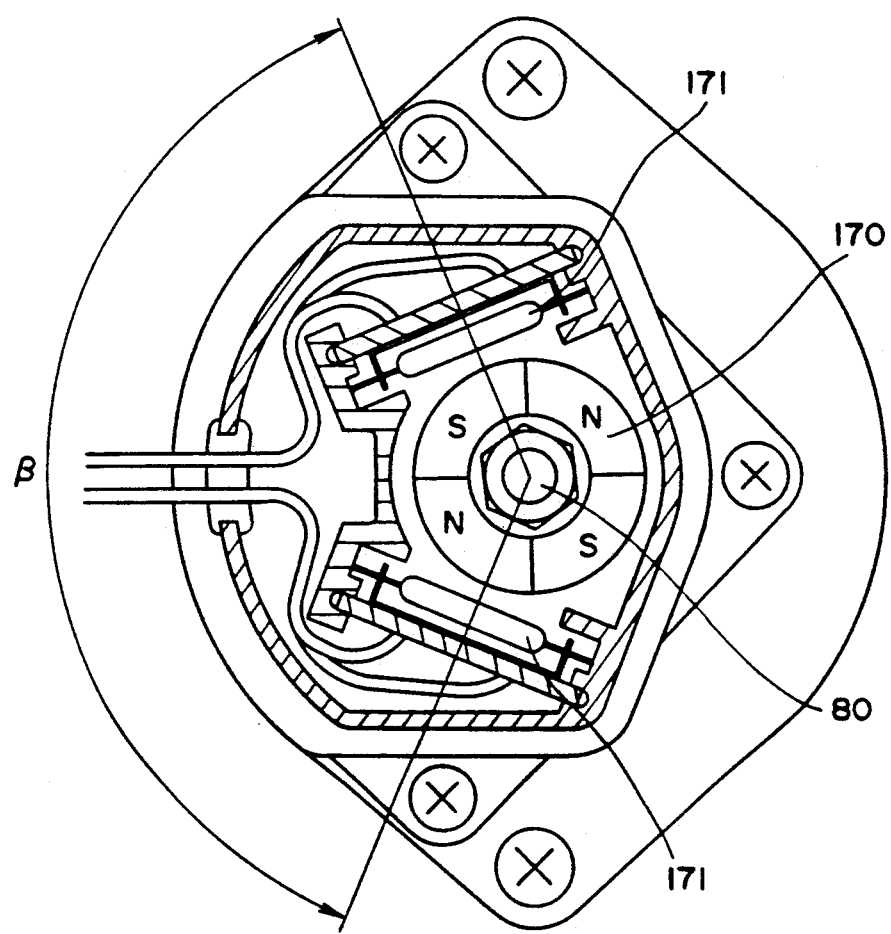
FIG. 3 is an enlarged sectional view showing a construction of a rotary detector along line III—III of FIG. 1.

The present invention will be described referring to drawings showing embodiments thereof. FIG. 1 is a partially broken front view of a power steering apparatus related to the invention. FIG. 2 is an enlarged sectional view along line II—II of FIG. 1. FIG. 3 is an enlarged sectional view showing a construction of a rotary detector along line III—III of FIG. 1.

In the figures, reference numeral 1 designates a rack shaft inserted concentrically within a cylindrical rack shaft case 2 fixed at a part of a vehicle body with its longitudinal direction as right-left direction. Numeral 3 is a pinion shaft supported rotatably in the state that the shaft center thereof intersects obliquely against the rack shaft 1 at the inside of a pinion shaft case 4 connected following the vicinity of one end portion of the rack shaft 2.

The pinion shaft 3, as shown in FIG. 2, consists of an upper shaft 3a and a lower shaft 3b connected coaxially with each other through a torsion bar 5, the upper shaft 3a being supported inside of the pinion shaft case 4 by a ball bearing 40 with its upper end portion interlockingly combined to a steering wheel through a universal joint not shown. And the lower shaft 3b at the neighborhood position of the upper end portion is supported inside of the pinion shaft case 4 by a four-point contact ball bearing 41 in the state that the proper length of the under portion thereof is projected from a downside opening of the pinion shaft case 4. The four-point contact ball bearing 41 is fitted from outside to the lower shaft 3b from lower end portion side, and is positioned outside of the lower shaft 3b in the axial direction with both sides of the inner ring being hold, by steps formed in the vicinity of the upper end portion of the lower shaft 3b and collar 42 fixed from outside from the lower end portion side and caulked to the peripheral surface. Then it is fitted into the pinion shaft case 4 together with the lower shaft 3b from aforementioned downside opening, and is positioned inside of the pinion shaft case 4 in the axial direction with both sides of the outer ring being hold, by a circular shoulder part formed at the lower part of the case 4 and a lock nut 43 screwed to the case 4 from the opening, and loads radial load acting upon the lower shaft 3b and thrust load of both directions.

At the middle portion of the lower shaft 3b projected from the pinion shaft case 4, pinion teeth 30 in an appropriate length are formed in the axial direction thereof. In the case where the pinion shaft case 4 is fixed at the upper side of aforesaid rack shaft case 2 by fixing bolt 44, the pinion teeth 30 engages with rack teeth 10 formed at a position a little close to one end portion of the rack shaft 1 in the axial direction thereof in an appropriate length inside of the rack shaft case 2, making the lower shaft 3b with rack shaft 1 engage, with their shaft centers intersect obliquely with each other. The lower shaft 3b is extended downward further from the position of engagement with the rack shaft 1, a big bevel gear 31 with the teeth-formed face thereof tilting downward being fittedly mounted coaxially with the lower shaft 3b at the lower end portion thereof. The lower shaft 3b is supported by needle roller bearing 33 in a bevel gear housing 20 connected following the downside of the rack shaft case 2 in the state of surrounding the big bevel gear 31. Accordingly, the lower shaft 3b is supported at both sides of the position of engagement of the rack teeth 10 with the pinion teeth 30 by the four-point contact ball bearing 41 and needle roller bearing 33, thereby flexing quantity of the lower shaft 3b at the position of engagement is kept within the tolerance.

Still more, at the position of engagement of the rack teeth 10 with the pinion teeth 30, a pressing piece 12 for pressing the rack shaft 1 by biasing force of a pressing spring 11 forward the pinion shaft 3 is provided so that the rack teeth 10 and the pinion teeth 30 can be engaged without any gap. The rack shaft 1 is, at the position of engagement, supported by the pressing piece 12 and the lower shaft 3b in the state that it is held from both sides of radial direction as well as it is supported by bearing bush 13 fitted into an end portion of the rack shaft case 2 opposite to the connected position of the pinion shaft case 4 with itself, it being movable freely in its axial direction inside of the rack shaft case 2. Both right and left end portions of the rack shaft 1 projected respectively at both sides of the rack shaft case 2 is connected to tie rods 15, 15 stretching respectively to the right and left wheels not shown through respective ball and socket joints 14, 14, the wheels being steered to right or left according to the movement of the rack shaft 1 in the axial direction thereof.

In FIG. 2, reference numeral 6 designates a torque sensor for detecting steering torque exerted on the steering wheel. The torque sensor 6 uses a potentiometer comprising a resistance holding member 60 which is outfitted to the upper shaft 3a, rotates therewith, and at the downside end surface, forms a circular resistance with the shaft center of the upper shaft 3a being the center, and a detecting piece holding member 61 which is outfitted to the lower shaft 3b, rotates therewith and, at the upside end surface, forms a detecting piece which slidely-contacts to a point in a radial direction on the resistance. The upper shaft 3a of the pinion shaft 3 rotates around the axial shaft according to the rotation of the steering wheel, however, road surface resistance acting upon the wheels acts upon the lower shaft 3b through the rack shaft 1, thereby, torsion corresponding to the steering torque exerted on the steering wheel is produced at torsion bar 5 interposed between the two shafts. A torque sensor 6 outputs relative displacement in the circumferential direction created between the upper shaft 3a and the lower shaft 3b accompanying the torsion of the torsion bar 5, as a potential corresponding to slidely contact position of the detecting piece with the resistance and in the case where the torsion is not created at the torsion bar 5, in other words, in the case where the steering operation is not performed, it is initialized so as to output the specified reference potential. The output signal of the torque sensor 6 is inputted in a control unit 7 which compares the signal with the reference potential to recognize the direction and size of the steering torque, then generates a driving signal to a motor 8 for assisting steering force provided in such a way as described later.

The motor 8 for assisting steering force is to transmit the turning force thereof to aforementioned lower shaft 3b through an electromagnetic clutch 16, epicycle reduction gear 9 and small bevel gear 32 which engages with the big bevel gear 31 and is smaller than the big bevel gear 31 in diameter.

The electromagnetic clutch 16 consists of a coil unit 161 which is annular in shape and fixed to a middle case 81 of the motor 8, a moving unit 162 which is outfitted at one side of a rotation axis 80 of the motor 8 coaxially therewith and rotates with the rotation axis 80, and engaging part 163 which is discoid in shape, faces the moving unit 162 and engages with the moving unit 162 by electromagnetic force caused by power supply to the coil unit 161, performing engaging and disengaging of turning force of the motor 8.

The epicycle reduction gear 9 consists of a sun shaft 90 which is fitted into the engaging part 163, rotates and has a sun gear supported at one end thereof by a bearing fitted into the moving unit 162, and supported at the other end by a bearing fitted into a planet carrier 93 to be described later, an outer ring 91 which is circular in shape and fixed to a casing end surface 82 of the motor 8 coaxially with the rotation axis 80, a plurality of planet gears 92, 92 . . . which rotatably contacts with the inner surface of the outer ring 91 and with the outer surface of the sun gear of the sun shaft 90 respectively, autorotate around the shaft center respectively as well as revolve around the shaft center of the sun gear, and the planet carrier 93 which supports rotatably respective planet gears 92, 92 . . . . The epicycle reduction gear 9 has a smaller outer diameter than that of the motor 8 and is integrated with the motor 8 and electromagnetic clutch 16 at one side of the rotation axis 80. An output shaft 94 of the epicycle reduction gear 9 is fitted into and fixed at a position of the shaft center of the planet carrier 93 which is positioned coaxially with the rotation axis 80 of the motor 8, and is projected in an appropriate length outside of the casing. At the tip portion of the output shaft 94, the small bevel gear 32 is fixedly mounted with its teeth-formed face turned toward the tip portion side, the small bevel gear 32 being constructed so as to rotate, together with the output shaft 94, corresponding to the revolution of the planet gears 92, 92 . . . .

The motor 8, electromagnetic clutch 16 and epicycle reduction gear 9 are fixed onto a blacket 2a provided outside of the rack shaft case 2, in the state that these shaft centers are approximately parallel to the shaft center of the rack shaft 1 and are fitted into the bevel gear housing 20 with the small bevel gear 32 being inside. And at the inside of the aforesaid housing 20, the small bevel gear 32 is engaged with the big bevel gear 31 fixedly mounted at the lower end portion of aforesaid lower shaft 3b.

Backlash adjustment between the big bevel gear 31 and the small bevel gear 32, in fitting the epicycle reduction gear 9 into the bevel housing 20, can be performed easily by changing thickness and/or number of shims to be interposed at the abutting portion of the casing of the epicycle reduction gear 9 with the bevel gear housing 20.

And on the other side of the rotation axis 80 of the motor 8, a rotary detector 17 for detecting the rotational position of the motor 8 is provided. The rotary detector 17 consists of a magnet board 170 outfitted at the other side of the axis of rotation 80 of the motor 8 and being discoid in shape, having two N-poles and two S-poles, and two reed switches 171, 171 fitted at a specified angle of incidence of $\beta$ (in this embodiment, $\beta = 135°$) around the magnet board 170.

Figure 4:
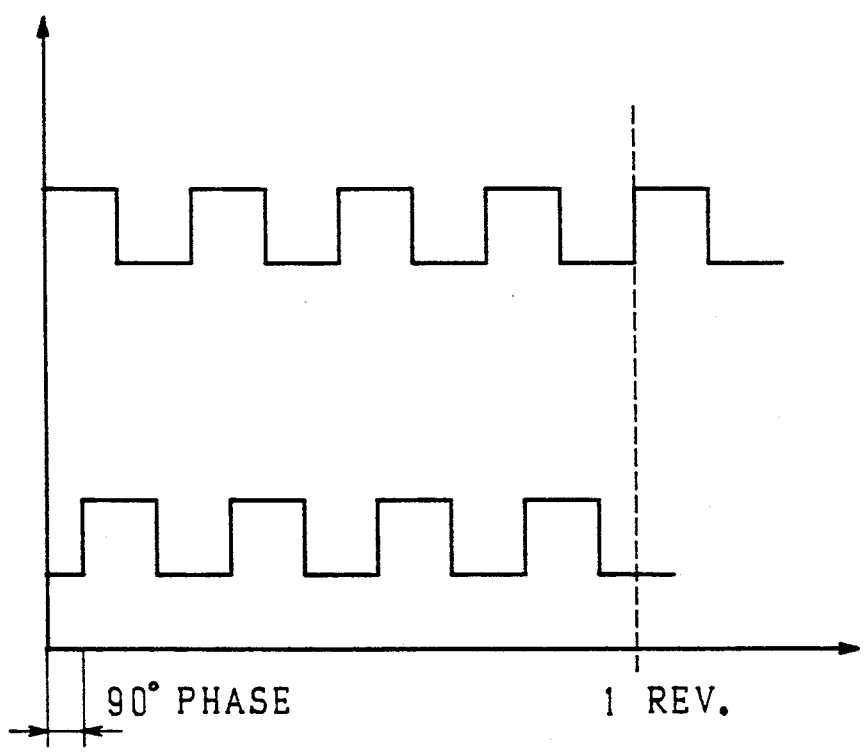
FIG. 4 is a waveform chart showing an output waveform of the rotary detector.

FIG. 4 is a waveform chart indicating an output waveform of the rotary detector 17. As the two reed switches 171, 171 are fitted at the angle of incidence $\beta$ being 135°, the output waveform is outputted with the phase deviating 90°. The rotary detector 17 has resolution capacity of 1/16 of one rotation by detecting leading and trailing edge as respective four waveforms are outputted by one rotation.

The rotary detector 17, when compared with the conventional rotary detectors such as tachogenerator and the like, is capable of detecting from 0 number of rotation, thereby capable of detecting the relative position of a rotor. Still more, it is small-sized, has a great resistance to high temperature, has little aged deterioration and is inexpensive, compared with a rotary encoder of a photo interrupter type. Still, as the output waveform becomes the pulse output, the detected result can be taken easily into CPU such as micro computer and the like.

Also in the control unit 7, the output signal of the rotary detector 17 and the output signal of a vehicle speed sensor 18 for detecting vehicle speed are inputted as well as the output signal of the torque sensor 6, and hereupon the control to be described later is carried out, a driving signal for driving the motor 8 and the electromagnetic clutch 16 is outputted.

Next, explanation will be given on the control at the control unit 7.

Figure 5:
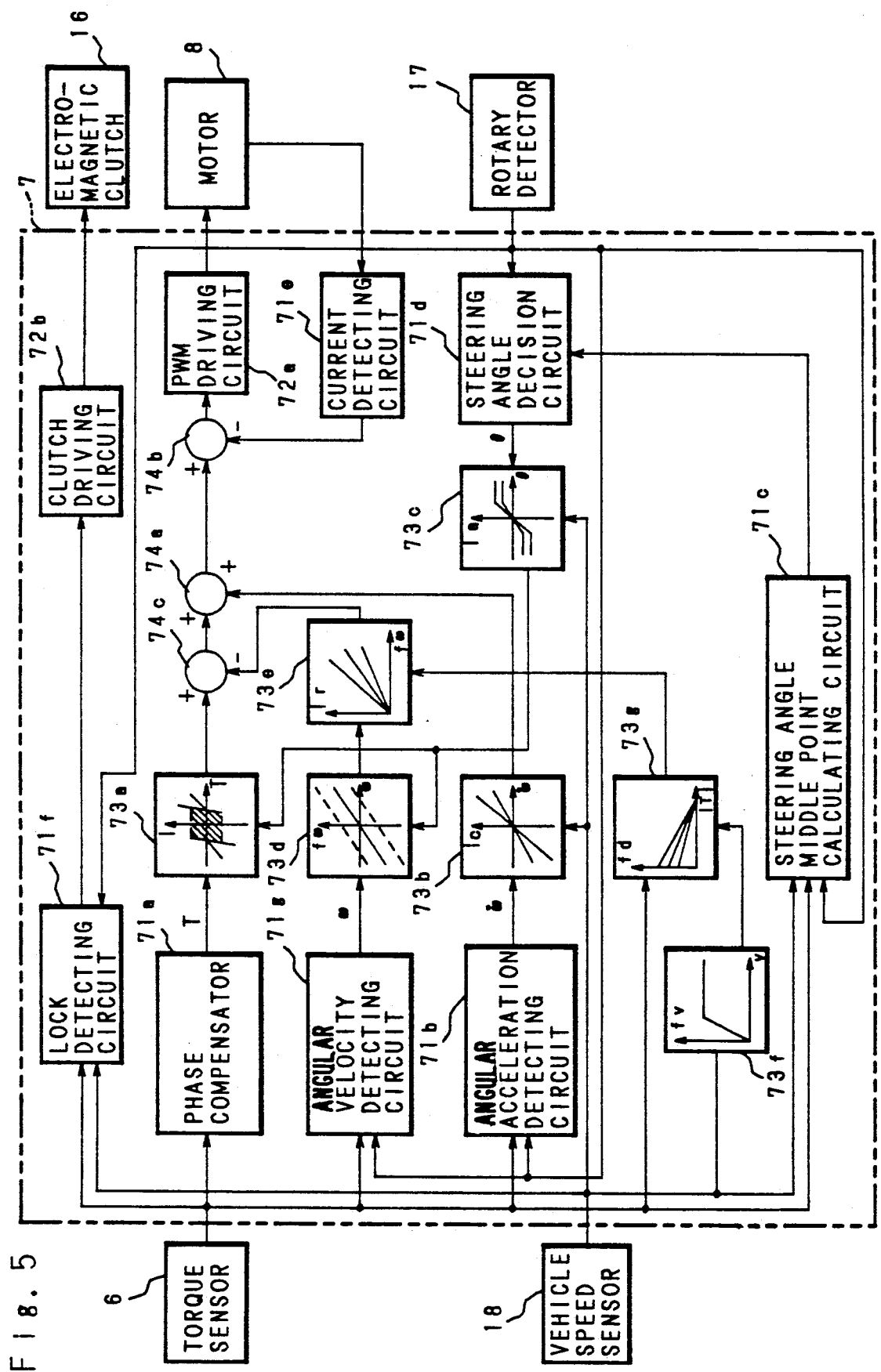
FIG. 5 is a block diagram showing a construction and operation of a control unit.

FIG. 5 is a block diagram showing the construction and the control operation of the control unit.

The torque detecting signal of the torque sensor 6 is inputted respectively into a phase compensator 71a for advancing the phase forward and stabilizing the system, an angle acceleration detecting circuit 71b for detecting angular acceleration $\dot{\omega}$ of rotations of the steering wheel, a steering angle middle point calculating circiut 71c for deciding the middle point of the steering mechanism, a lock detecting circuit for detecting a lock of the motor 8, an angular velocity detecting circuit for detecting angular velocity $\omega$ of the steering wheel, and a torque function unit 73g generating function corresponding to the absolute value $|T|$ of the steering torque T.

The vehicle speed detecting signal of the vehicle speed sensor 18 is inputted respectively to the lock detecting circuit 71f, the steering angle middle point calculating circuit 71c, the vehicle speed function unit 73f for generating function corresponding to vehicle speed V, a compensation current function unit 73b which is given angular acceleration $\dot{\omega}$ of the steering wheel outputted from the angular acceleration detecting circuit 71b and decides compensation current Ic for compensating force of inertia during the time of acceleration and deccelaration of the motor 8 and for compensating force of inertia of base carrier of wheels, corresponding to the angular acceleration $\dot{\omega}$ and the vehicle speed V, and a variable current function unit 73c which is given a steering angle $\theta$ outputted from a steering angle decision circuit 71d to be described later and decides variable current Ia for changing a characteristic of indicator current I corresponding to the steering angle $\theta$ and the vehicle speed V.

And the rotary detecting signal of the rotary detector 17 is inputted to the steering angle decision circuit 71d for deciding the steering angle $\theta$ from the lock detecting circuit 71f, the steering angle middle point calculating circuit 71c, the angular acceleration detecting circuit 71b, the angular velocity detecting circuit 71g and the steering angle decision circuit 71d for deciding the steering angle $\theta$ based on the rotary detecting signal and the middle point of the steering angle middle point calculating circuit 71c.

The lock detecting circuit 71f detects the rotation of the motor 8 when the values of the torque and vehicle speed are larger than their respective specified values by using the inputted rotary detecting signal, vehicle speed detecting signal and torque detecting signal, thereby detecting the presence of lock, the output signal thereof is given to the electromagnetic clutch 16 through a driving circuit 72b.

And the output $\omega$ of the angular velocity detecting circuit 71g is given to an angular velocity function unit 73d for generating function corresponding to the angular velocity.

Still more, variable current Ia is given to the aforementioned function unit 73d, and offset quantity is given by the variable current Ia. And the output signal of the phase compensator 71a and the variable current Ia are given to an indicator current function unit 73a for generating indicator current I to the motor 8. And the output signal of the vehicle speed function unit 73f is given to the torque function unit 73g, thereupon a torque function fd corresponding to the vehicle speed V being outputted. The output is given to subtractor current function unit 73e, thereupon subtractor current Ir being produced by the output of the angular velocity function unit 73d and the output of the torque function unit 73g.

The output signal of the indicator current function unit 73a is inputted to a subtractor 74c, thereupon subtractor current Ir which is the output of the subtractor current function unit 73e is subtracted, and the subtracted result is given to an adder 74a.

The output signal of the compensation current function unit 73b is added to the adder 74a, and the added result is given to a subtractor 74b.

At the subtractor 74b, a feedback signal from current detecting circuit 71e for detecting consumed current of the motor 8 from the aforementioned added result is subtracted, the subtracted result being given to the motor 8 through a PWM (Pulse-Width Modulation) driving circuit 72a.

Next, explanation will be given on the operation.

Figure 6:
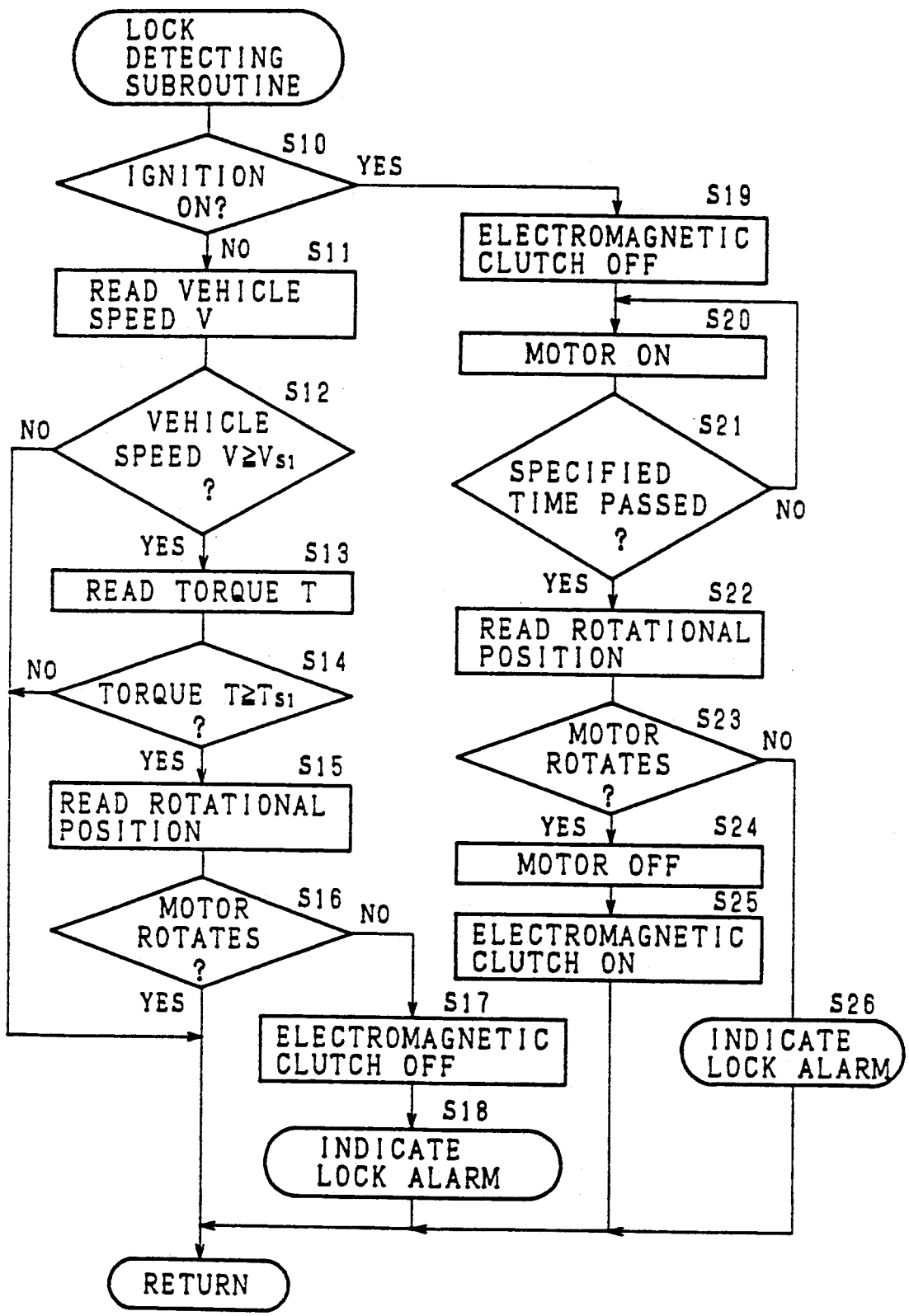
FIG. 6–FIG. 10 are flow charts explanatory of each control operation.

FIG. 6 is a flow chart showing a control of lock detection. In Step 10, whether or not ignition is ON is judged, and when not ON, the vehicle speed at the vehicle speed sensor 18 is read in Step 11. In Step 12, whether or not the vehicle speed V is larger than vehicle speed threshold $V_{S1}$ is judged, and when larger, the steering torque T is read from the torque sensor 6 in next Step 13. In Step 14, whether or not the steering torque T is larger than torque threshold $T_{S1}$ is judged, and when larger, the rotational position of the motor 8 from the rotary detector 17 is read in Step 15, and whether or not the motor 8 is rotating is judged on the basis of the value in Step 16. When the motor 8 is rotating, processing returns, and when it is not rotating, the lock detecting circuit 71f detects that the motor 8 is locked, and, in Step 17, the electromagnetic clutch 16 is OFF, the connecting of the motor 8 with the epicycle reduction gear 9 being cut off, thereby freeing the steering mechanism from the motor 8. And in Step 18, a lock alarm not shown is ON and processing returns.

On the other hand, the ignition switch is judged to be ON in Step 10, the electromagnetic clutch 16 is OFF in Step 19, and the motor 8 is ON in Step 20. When the motor 8 is ON, the passage of the specified time is judged in Step 21, after that in Step 22, the rotational position of the motor 8 from the rotary detector 17 is read, and whether or not the motor 8 is rotating is judged in Step 23 on the basis of the value. When the motor 8 is rotating, the motor 8 is OFF in Step 24, and the electromagnetic clutch 16 is ON in Step 25. When the motor 8 is judged not to be rotating in Step 23, the lock alarm is ON in Step 26 and processing returns.

Next, explanation will be given on angular acceleration detection and a motor inertia control using thereof.

Figure 7:
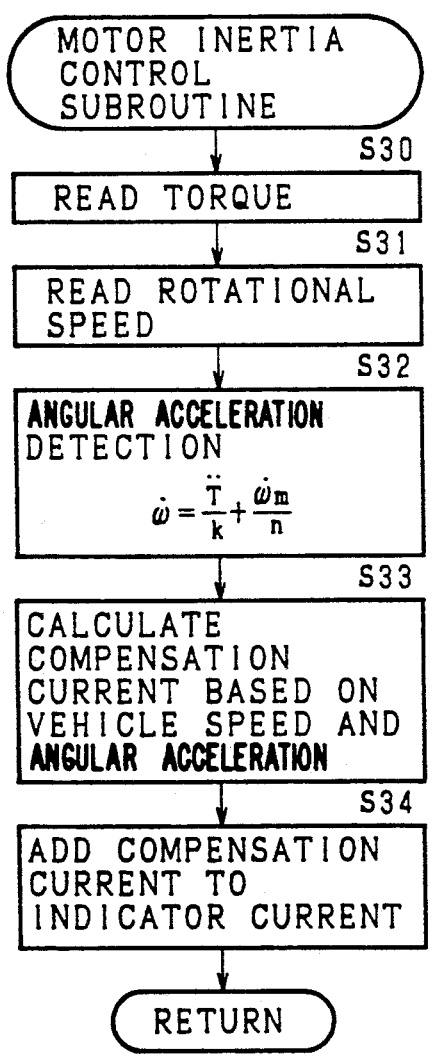

FIG. 7 is a flow chart showing calculation of an angular acceleration and the motor inertia control using thereof. At first, the torque T from the torque sensor 6 is read in Step 30, then the rotational speed $\omega_m$ of the motor 8 from the rotary detector 17 is read by the angular acceleration detecting circuit 71b in Step 31, and in Step 32, the angular acceleration $\dot{\omega}$ of the steering wheels is calculated by the following equations.

$$T = K(\theta_i - \theta_0)$$

$$\theta_i - \theta_0 = \frac{T}{K}$$

$$\theta_i - \theta_0 = \frac{T}{K}$$

-continued $$\theta_i = \frac{T}{K} + \theta_0$$

Here, K is a spring constant of a torsion bar. On the other hand, $$\theta_0 = \frac{\omega_m}{n} \quad \text{n is reduction ratio.}$$

$$\theta_0 = \frac{\omega_m}{n}$$

$$\theta_i = \omega = \frac{T}{K} + \frac{\omega_m}{n}$$

Next, in Step 33 by the angular acceleration $\dot{\omega}$ and the vehicle speed V given to the steering wheel calculated in Step 32, compensation current Ic for compensating the effect created by force of inertia of the motor 8 and force of inertia of a base carrier predetermined at the compensation current function unit 73b is calculated. Next, in Step 34, the compensation current Ic calculated in Step 33 is inputted in the adder 74a and the indicator current I calculated in the indicator current function unit 73a is added thereto, thereby the steering feeling is to be improved as the compensation current Ic is added to the indicator current I, correspondingly to the force of inertia when the angular acceleration is detected at starting and finishing the steering assistance and so on by the motor 8, and the force of inertia of the base carrier.

Next, the calculation of steering wheel middle point and the return control of the steering wheel using thereof will be explained.

Figure 8:
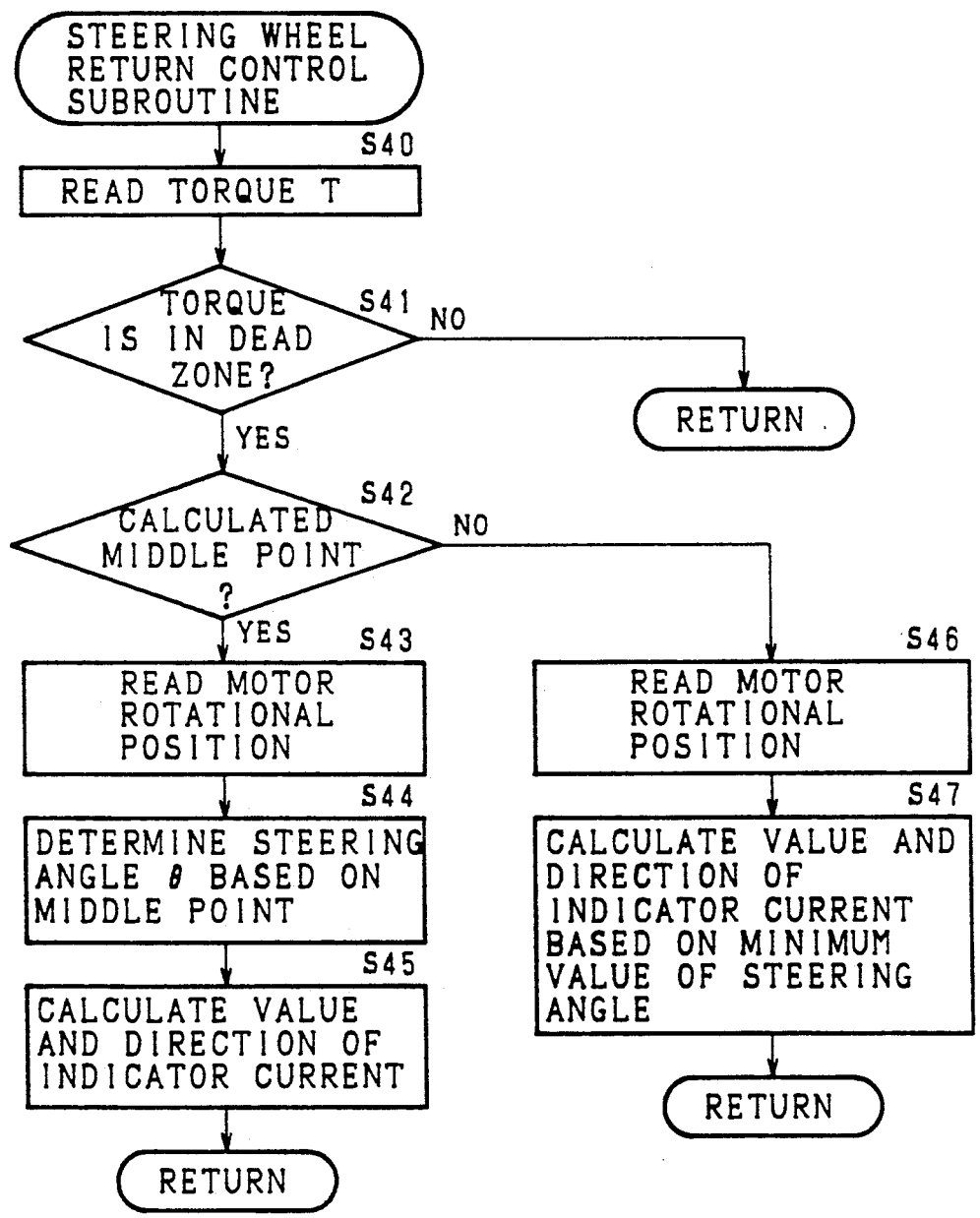
Figure 9:
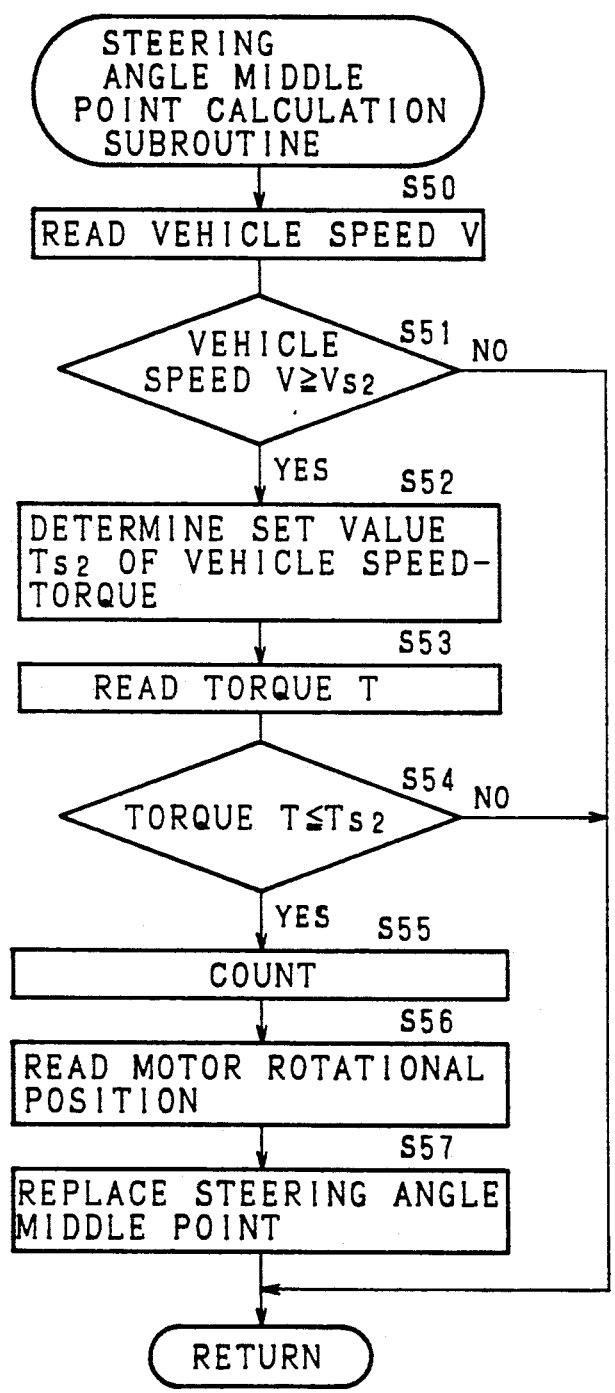
Figure 10:
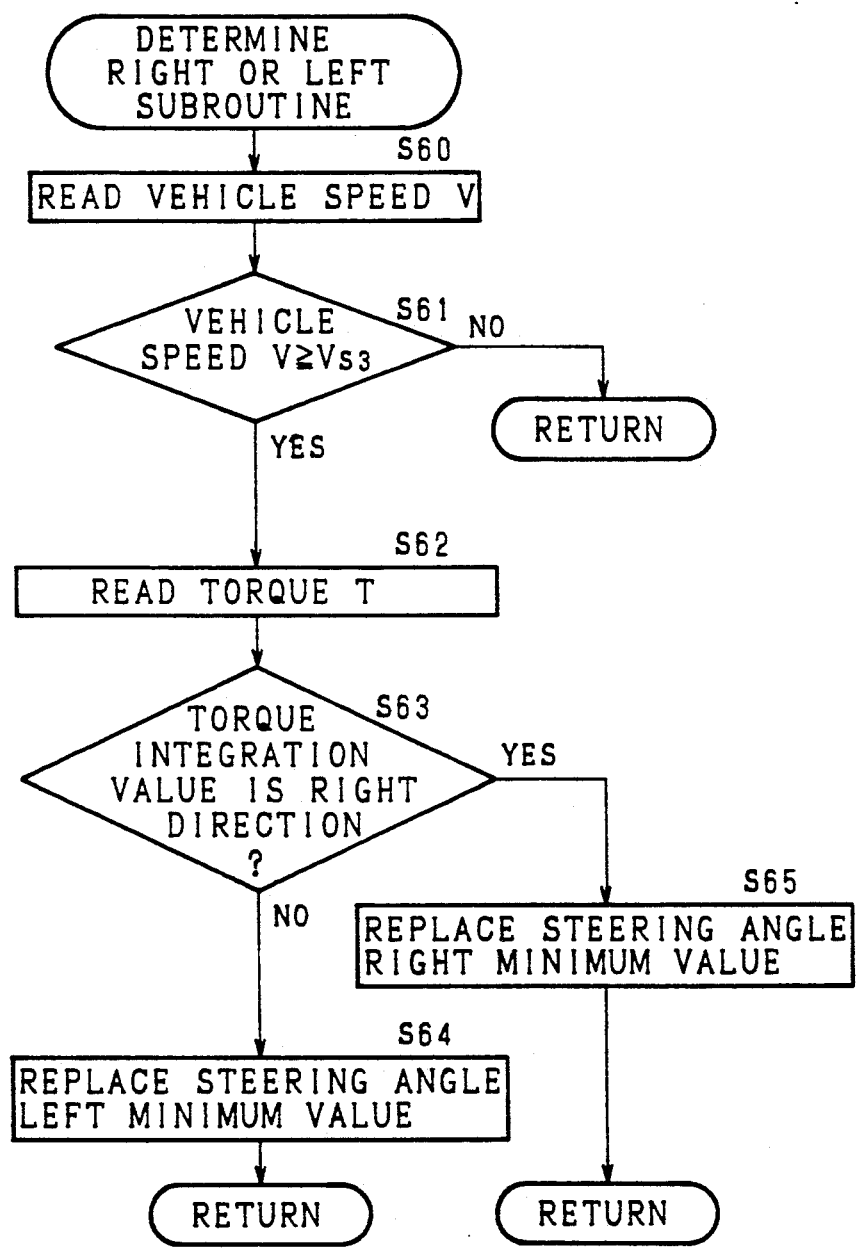
Figure 11:
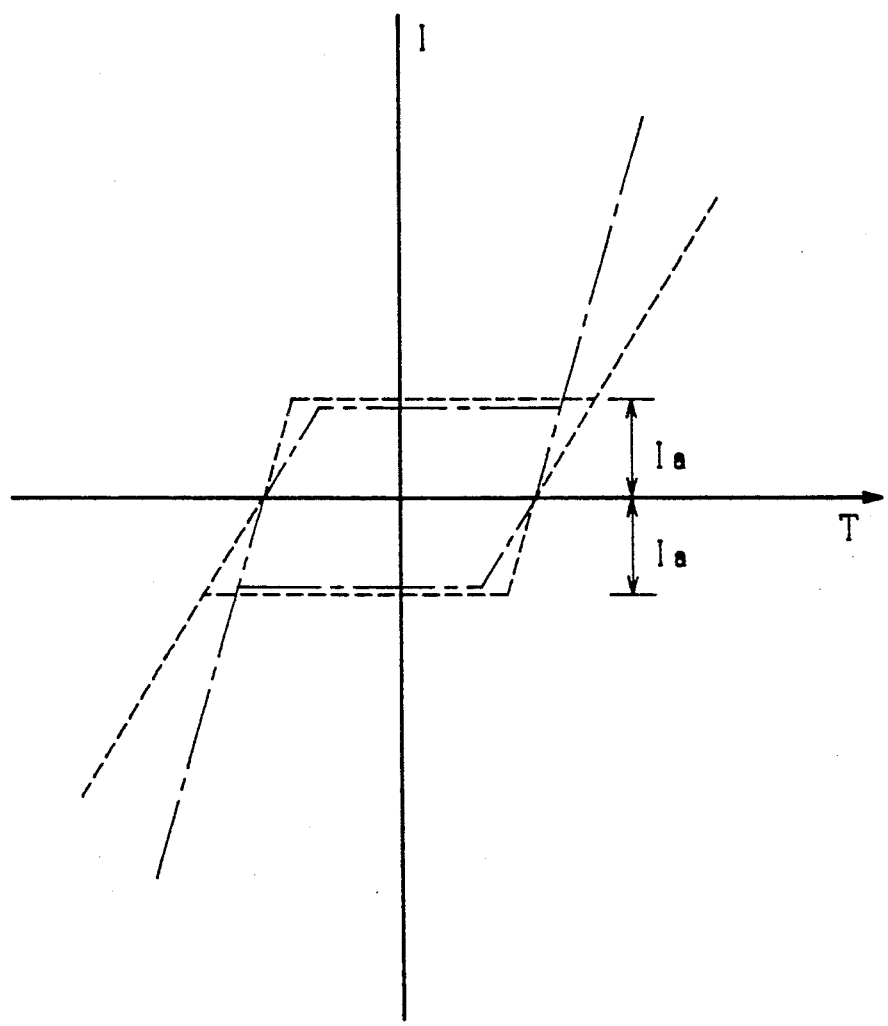
FIG. 11 is a graph showing a characteristic of relation between motor current and torque at an indicator current function unit.

FIG. 8 is the return control of the steering wheel. FIG. 9 is the calculation of the middle point steering wheel, and FIG. 10 is a flow chart showing the decision procedure of right-left position of the steering wheel. FIG. 11 is a graph showing the characteristics of relation between the motor current and torque at the indicator current function unit 73a, the axis of ordinate showing the indicator current I and the axis of the abscissa showing the torque T.

Still more, a broken line and the dashed line show the characteristics of the vehicle speed being large and the vehicle speed being small respectively.

In the FIG. 8, in Step 40, the torque T is read at first, in Step 41, whether or not the torque T is in the dead zone is judged. When the torque T is in the dead zone, whether or not the middle point calculation routine to be described later is finished is judged in Step 42. When the middle point calculation is finished, the rotational position of the motor 8 is read from the rotary detector 17 in Step 43, and then in Step 44 the steering angle $\theta$ is decided at the steering angle decision circuit 71d by using the rotational position and the middle point. When the steering angle $\theta$ is decided, in Step 45, variable current Ia is calculated at the variable current function unit 73c by the steering angle $\theta$ and the vehicle speed V, the value and the direction of the indicator current I being calculated at the indicator current function unit 73a.

On the other hand, in Step 41, when the torque T is not judged in the dead zone processing returns, and when the middle point calculation is not finished in Step 42, the rotational position of the motor 8 is read from the rotary detector 17 in Step 46, the variable current Ia is calculated by using the steering angle minimum value calculated at right-left decision routine to be described later in Step 47, thereby calculating the value and direction of the indicator current I.

In the middle point calculation routine shown in FIG. 9, the vehicle speed is read in Step 50, whether or not the vehicle speed V is larger than threshold $V_{S2}$ is judged in Step 51, and when larger, the torque set value $T_{S2}$ corresponding to the vehicle speed is set in Step 52, and then the torque T is read in Step 53, and in Step 54, whether or not the torque T is smaller than the torque set value $T_{S2}$ is judged. When smaller, in Step 55, the number of the torque T is counted, and in Step 56, the rotational position of the motor 8 is read. And in Step 57, the rotational position is added to the sum of rotational position until the preceding time, the added result being divided the number of count to calculate the steering middle point, thereby replacing the value of the steering middle point. And, in Step 51, the vehicle speed V is smaller than the threshold $V_{S2}$, or the torque T is larger than the torque set value $T_{S2}$, processing returns.

But as the middle point calculation requires much time for calculating, the return control is carried out by the right-left decision routine to be described next until the calculating is finished.

In the right-left decision routine shown in FIG. 10, the vehicle speed V is read in Step 60, whether or not the vehicle speed V is larger than the threshold $V_{S3}$ is judged in Step 61, when larger, the torque T is read in Step 62, the torque T is integrated in Step 63, and the direction of the integrated value is judged to be right or left. When right, the right value of the steering angle minimum value is replaced in Step 65, and when left, the left value of the steering angle minimum value is replaced in Step 64, and processing returns.

On the other hand, as shown in FIG. 11, when the variable current Ia is calculated using the steering angle $\theta$ in the return control, the indicator current I during the return control of the steering wheel when the torque is in the dead zone is changed corresponding to the variable current Ia and the vehicle speed V. For example, when the vehicle speed V is large, as shown with the broken line, the increasing rate of the indicator current I is made to be large when the torque T enters the dead zone, the motor 8 being controlled so that the return to the middle point is made faster. On the contrary, when the vehicle speed is small, as shown with the dashed line, the increasing rate of the indicator current I is made to be small when the torque T enters into the dead zone, the motor 8 being controlled so that the return to the middle point is made slower.

Next, explanation will be given on an angular velocity control of the steering wheel which is an essential part of the invention.

Figure 12:
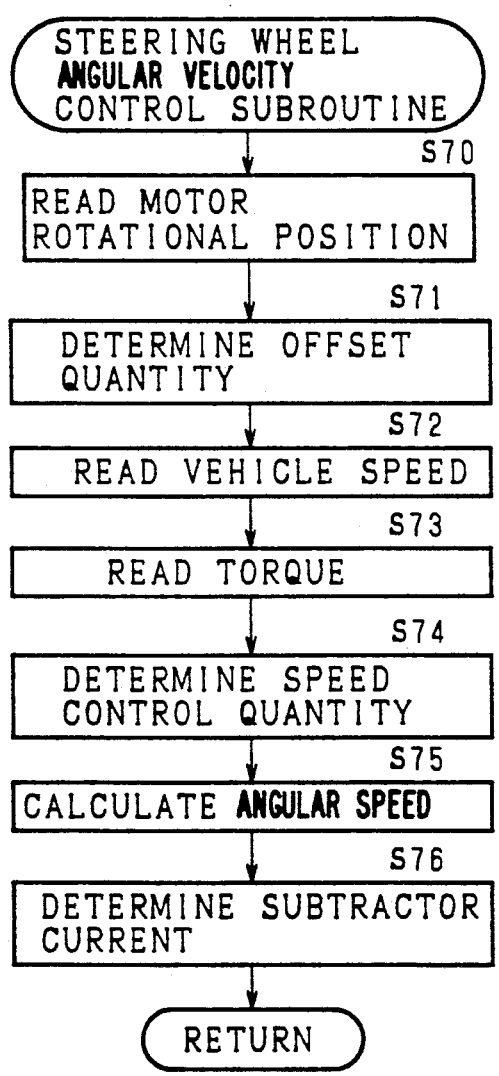
FIG. 12 is a flow chart showing an angular velocity control.

FIG. 12 is a flow chart showing the angular velocity control of the steering wheel. At first, in Step 70, the rotational position of the motor 8 is read by using the output of the rotary detector 17. Next, in Step 71, the steering angle is determined by the rotational position, offset quantity corresponding to the steering angle is given to the angular velocity function unit 73d. Next, in Step 72 the vehicle speed V is read, and in Step 73, the torque T is read. Next, in Step 74, vehicle speed function fv is calculated at a vehicle speed function unit 73f by using the vehicle speed V. Then speed control quantity fd is decided at the torque function unit 73g by using the vehicle speed function fv and the torque T. Next, in Step 75, the angular velocity $\omega$ is detected, thereby an angular velocity function fω added offset quantity is calculated.

Next, subtractor current Ir is calculated at the subtractor current function unit 73e by using the angular velocity function fω and the speed control quantity fd calculated in Step 76, the subtractor current Ir being inputted into the subtractor 74c, thereby the current corresponding to the torque T and the angular velocity ω is subtracted from the indicator current I.

As explained above, according to the present invention, the electric current corresponding to the steering torque and angular velocity is subtracted from the indicator current of the motor, and when both of the steering torque and angular velocity are large, the quantity of subtraction is reduced, and when the steering torque is small and the angular velocity is large, the quantity of subtraction is made larger, so that the steering control is capable of tracing the rotation of the steering wheel satisfactorily and is capable of preventing the steering wheel from returning extremely, by giving large assisting power during a steering time of quick handling of the steering wheel, and by giving large speed reducing power during a return time of quick handling of the steering wheel.

Next, explanation will be given on another embodiment with priority given to the different points from aforesaid embodiment.

Figure 13:
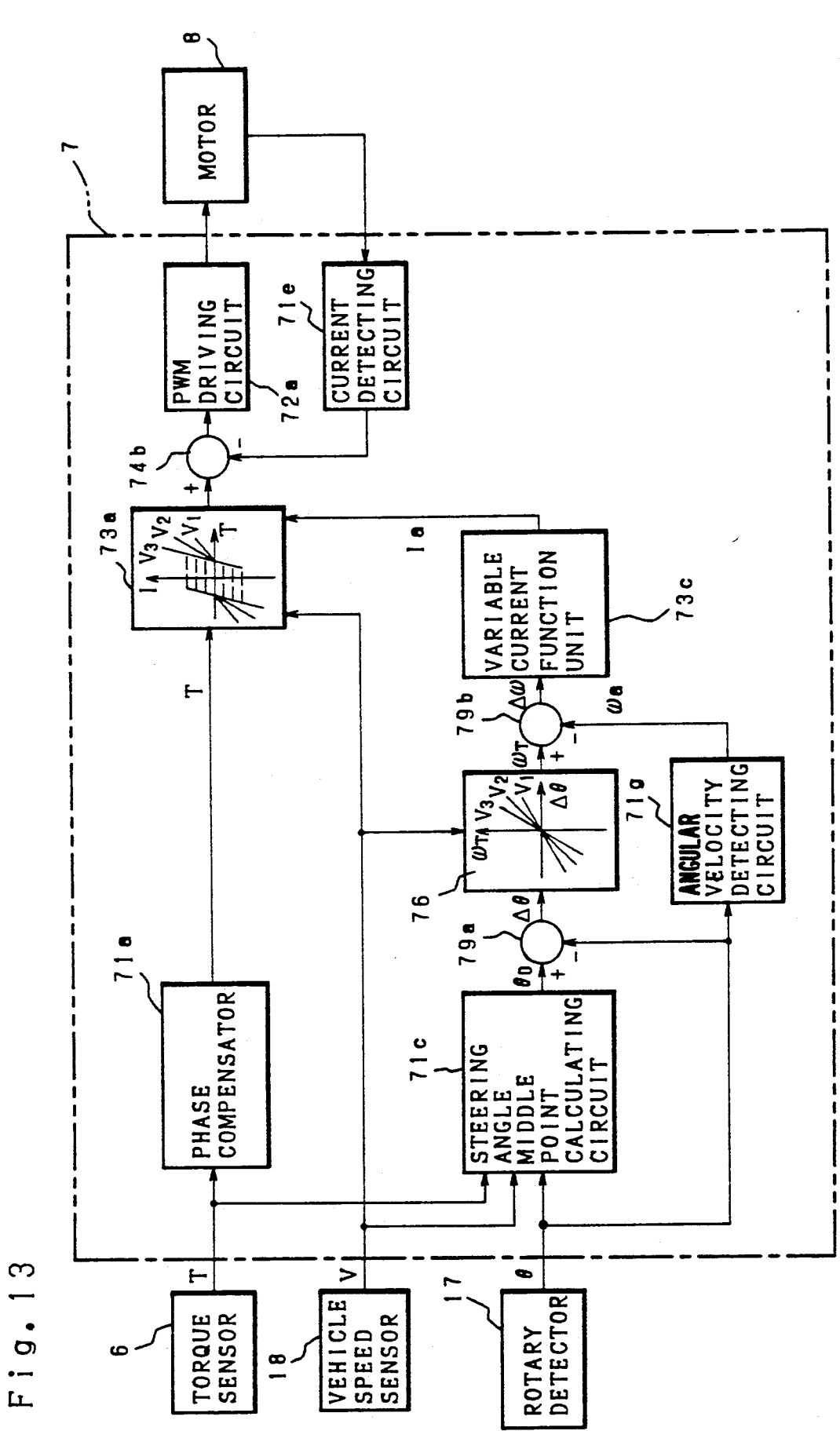
FIG. 13 is a block diagram showing a construction and operation of a control unit of another embodiment.

FIG. 13 is a block diagram showing a construction and control operation of a control unit of this embodiment.

The torque detecting signal of the torque sensor 6 is respectively inputted to the phase compensator 71a for advancing the phase forward and stabilizing the system and the middle point calculating circuit 71c for deciding the middle point of the steering mechanism.

The vehicle speed detecting signal of the vehicle speed sensor 18 is respectively inputted to the indicator current function unit 73a to be described later generating indicator current I to the motor 8, a return angular velocity setting function unit 76 setting the desired value of the return angular velocity of the steering wheel correspondingly to the steering angle $\Delta\theta$ and vehicle speed, and the steering angle middle point calculating circuit 71c.

The rotary detecting signal $\theta$, which is the rotational position of the motor 8, detected by the rotary detector 17 is respectively inputted to the middle point calculating circuit 71c and the angular velocity detecting circuit 71g for detecting the angular velocity of the steering wheel.

The steering angle middle point calculating circuit 71c determines the middle point position $\theta_0$ on the basis of the middle point calculation method to be described later based on the torque detecting signal T, vehicle speed detecting signal v and rotary detecting signal, the result being given to the adder 79a. The adder 79a determines the deviation value, that is, the steering angle $\Delta\theta$ between the rotational position $\theta$ of the steering wheel and the middle point, the result being given to the return angular velocity setting function unit 76.

At the return angular velocity setting function unit 76, the return angular velocity set value of the steering wheel against aforesaid steering angle $\Delta\theta$ which makes vehicle speed, $V_1, V_2, V_3 \ldots$ (here $V_1 > V_2 > V_3$) inputted from the vehicle speed sensor 18 to be parameters, is functionized, so, as the steering angle $\Delta\theta$ becomes smaller, the angular speed set value $\omega_T$ becomes smaller, and as the vehicle speed increases, the angular velocity set value $\omega_T$ becomes smaller.

The return angular velocity set value $\omega_T$ of the steering wheel is determined correspondingly to the steering angle $\Delta\theta$ inputted from aforesaid adder 79a and the vehicle speed inputted from the vehicle speed sensor 18, the result being inputted to the adder 79b. And, at the angular velocity detecting circuit 71g, the angular velocity $\omega_a$ at a time of steering of the steering wheel is determined by differentiating related to time the rotational quantity inputted from the rotary detector 17, the result being inputted to aforesaid adder 79b.

At the adder 79b, the angular velocity deviation $\Delta\omega = \omega_T - \omega_a$ between aforesaid return angular velocity set value $\omega_T$ and the angular velocity $\omega_a$ is determined, the result being inputted to the variable current function unit 73c. At the variable current function unit 73c, the relation between the angular velocity deviation $\Delta\omega$ and the variable current Ia at the time of returning the steering wheel to be described later is functionized and preset, the inputted angular velocity deviation $\Delta\omega$ is PID calculated, and variable current Ia corresponding to the calculated result is determined, the result being inputted to the indicator current function unit 73a.

Into the indicator current function unit 73a, the torque T being the output signal of aforesaid phase compensator 71a, the vehicle speed detecting signal v given from the vehicle speed sensor 18, and the variable current Ia from variable current function unit 73c are respectively inputted. At the indicator current function unit 73a, the vehicle speed detecting signal v and variable current Ia are made to be parameters, and the relation between the torque T and indicator current I to the motor 8 is previously functionized and set, the indicator current I to the motor 8 being determined by the torque T being the output signal of aforesaid phase compensator 71a, the result being inputted to the adder 74b.

Into the adder 74b, the indicator current I and the feedback signal from the current detecting circuit 71e detecting the consumed current of the motor 8 are inputted, the deviation between the two being calculated. The result is given to the motor 8 through PWM (Pulse-Width Modulation) driving circuit 72a.

Next, explanation will be given on the return control of the steering wheel, being an essential part of the invention, at the control unit 7 aforementioned.

Figure 14:
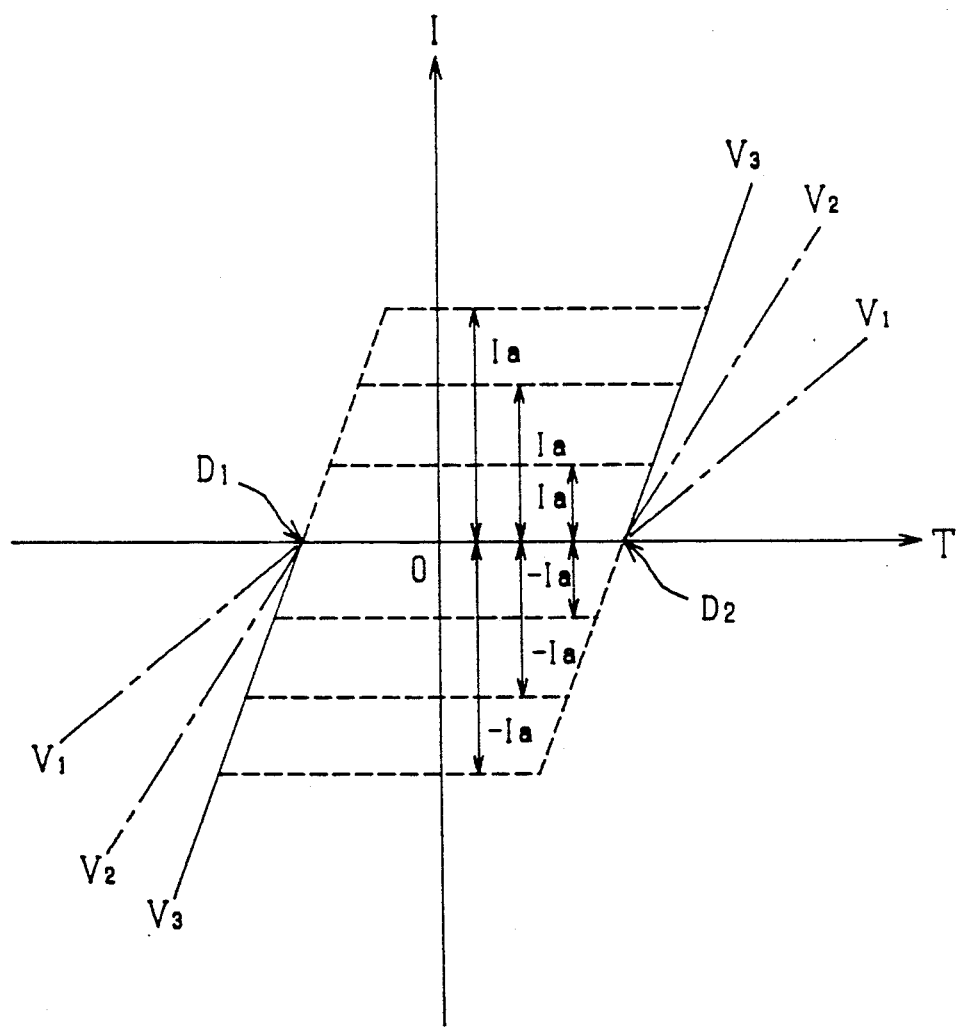
FIG. 14 is a graph showing a characteristic of a relation between motor current and torque at an indicator current function unit of another embodiment.

FIG. 14 is a graph showing a characteristic of a relation between the indicator current I and the torque T at the indicator current function unit 73a, the axis of ordinate showing the indicator current I, and the axis of abscissa the torque T. At the axis of abscissa, the positive side of the torque T shows the torque in the case of right steering, and the negative side left steering. And, at the axis of ordinate, the positive side of the indicator current I shows the (indicator) current for the motor 8 to make rotations of right steering, and the negative side the left steering.

Furthermore, the dashed lines show aforementioned characteristics being different depending upon the vehicle speed $V_1, V_2, V_3 \ldots$ and the broken lines show the indicator current I to the motor 8 at the time of the returning of the steering wheel which is changed by the compensation current Ia at the time of the returning of the steering wheel determined by the steering angular velocity deviation $\Delta\omega$.

$D_1$ to $D_2$ shows the dead zone, and in the case where the steering torque to the right (or left) exceeds the extent of the dead zone $D_1$ to $D_2$ by the steering operation, the indicator current I of the motor 8 increases as the torque T increases, thereby the steering assisting force increases. In this case, the relation between the torque T and the indicator current I depends upon the vehicle speed $V_1, V_2, V_3 \ldots$ (here, $V_1 > V_2 > V_3$), and as the vehicle speed becomes faster, the indicator current I against the torque T becomes smaller. In this way, in the case where the steering wheel is operated to the right (or left) and then it is returned, if the torque T enters into the dead zone $D_1$ to $D_2$, variable current $-Ia$ (or Ia) shown with the broken line becomes the indicator current I, thereafter, in the case where the torque T is within the dead zone $D_1$ to $D_2$, the indicator current I is constant controlled and the motor 8 is driven by the constant torque. By the above way, the steering assisting force at the time of the returning the steering wheel becomes constant.

Still the absolute value of the variable current Ia becomes larger as aforesaid steering angular velocity deviation $\Delta\omega$ becomes larger, and in the case where the deviation between the actual angular velocity $\omega_a$ of the steering wheel and the return angular velocity set value $\omega_T$ is large, the indicator current I is made larger and the control speed is made faster.

Since the middle point calculation method is the same as of aforesaid embodiment, explanation will be omitted.

Figure 15:
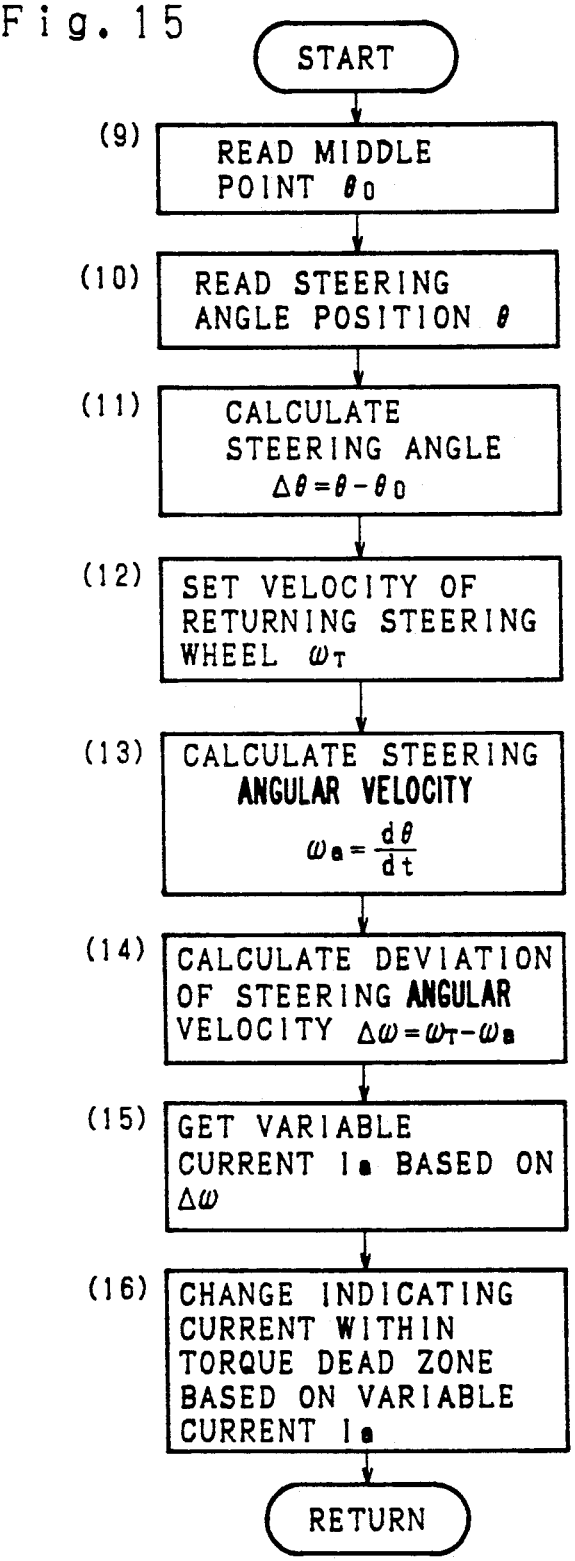
FIG. 15 is a flow chart showing the return control of a steering wheel.

FIG. 15 is a flow chart showing the return control of the steering wheel, that is, the operation of signal path from the adder 79a to the adder 74b shown in FIG. 13. In the return control of the steering wheel, in Step 9, the middle point position $\theta_0$ determined as aforementioned is read, and in Step 10, the steering position $\theta$ is read. Next, at the adder 79a, the middle point position $\theta_0$ is substracted from the steering position $\theta$ to determine the steering angle $\Delta\omega$ (Step 11).

In Step 12, at the return angular velocity setting function unit 76, the return angular velocity set value $\omega_T$ is determined on the basis of aforesaid steering angle $\Delta\omega$ and the vehicle speed V. On the other hand, at the angular velocity detecting circuit 71g, rotational quantity inputted from the rotary detector 17 is differentiated related to time thereby the actual steering angular velocity $\omega_a$ is determined (Step 13). In Step 14, the steering angular velocity $\omega_a$ is subtracted from aforesaid return angular velocity set value $\omega_T$ by the adder 79b, the steering angular velocity deviation $\Delta\omega$ is calculated. Next, in Step 15, at the variable current function unit 73c, aforesaid steering angular velocity deviation $\Delta\omega$ is PID calculated, then is conversed into variable current Ia on the basis of the present relation between the steering angular velocity deviation $\Delta\omega$ and variable current Ia. And in Step 16, at the indicator current function unit 73a, the setting of variable current Ia as shown in FIG. 14 is changed.

And the indicator current I is determined on the basis of the torque T, the vehicle speed $V_1, V_2, V_3 \ldots$, and the variable current Ia.

In the case where the value of the torque T is outside the dead zone $D_1$ to $D_2$, and the vehicle speed is fast $(V_1)$, the increasing rate of the indicator current I to the torque T is made to be small compared with the case where the vehicle speed is slow $(V_3)$, so, when the torque T is within the dead zone $D_1$ to $D_2$, the indicator current I is constant controlled by the value of aforesaid variable current Ia. The variable current Ia is set to be made larger as aforesaid steering angular velocity deviation $\Delta\omega$ becomes larger, thereby the following up against the return angular velocity set value $\omega_T$ of the steering angular velocity $\omega_a$ is heightened. The stabilized steering feeling can be gained in the vicinity of the steering angle middle point at the time of the returning of the steering wheel by carrying out the control above mentioned.

The steering angular velocity being controlled, as above described, correspondingly to the steering angle and the vehicle speed, thereby the steering wheel can be prevented from exceeding the middle point and stabilized steering can be gained.

As above described, in the power steering apparatus related to the invention, the return angular velocity of the steering wheel is set correspondingly to the steering wheel and vehicle speed, and the electric current supplied to the motor is controlled so that the actual angular velocity of the steering wheel is coincided with the above setting, thereby preventing the return control of the steering wheel from exceeding and the astringency of steering being better.

Next, explanation will be given on still another embodiment.

In the following, explanation will be given laying stress on the different points from the first embodiment.

Figure 16:
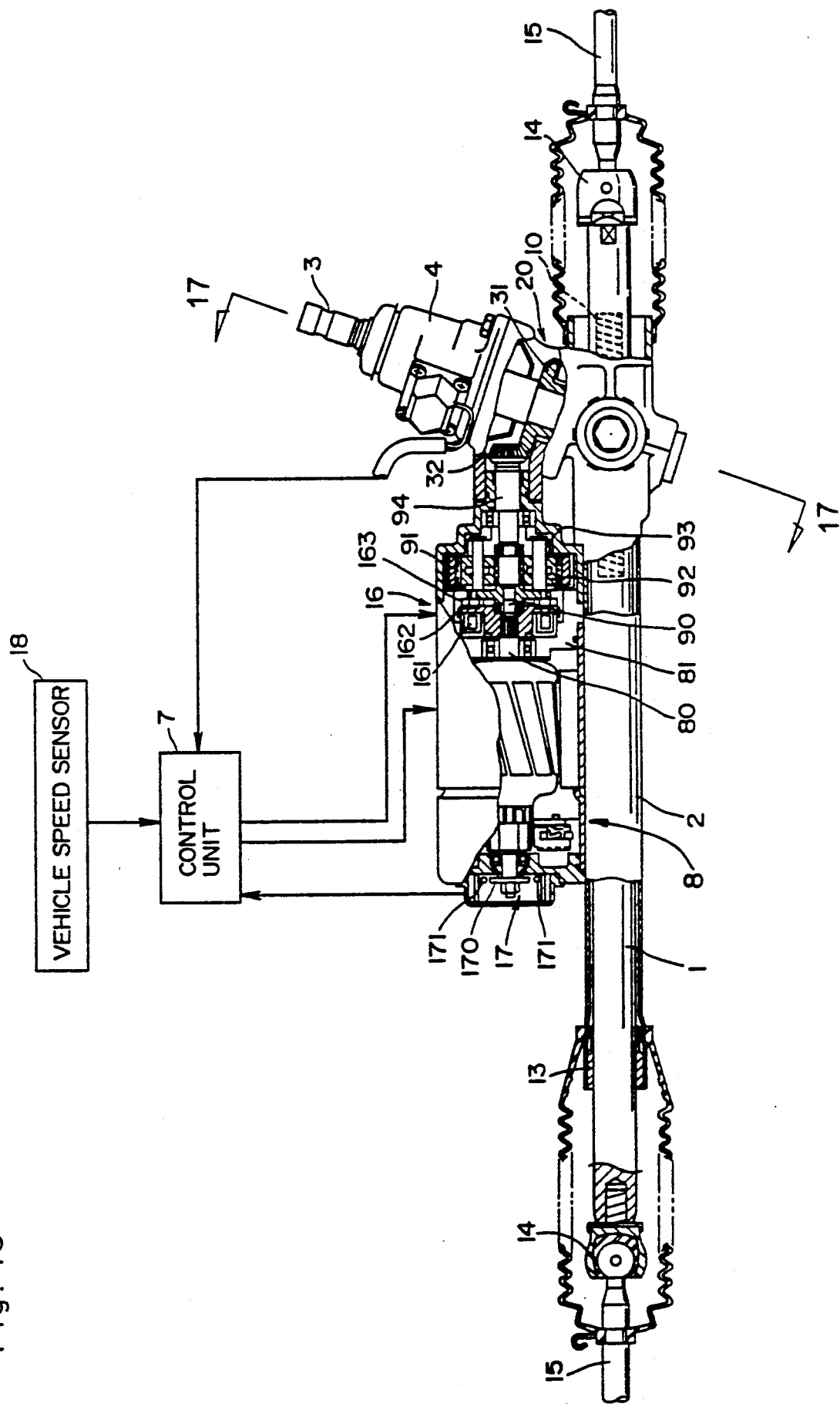
FIG. 16 is a partially broken front view of the third embodiment of the power steering apparatus of the invention.
Figure 17:
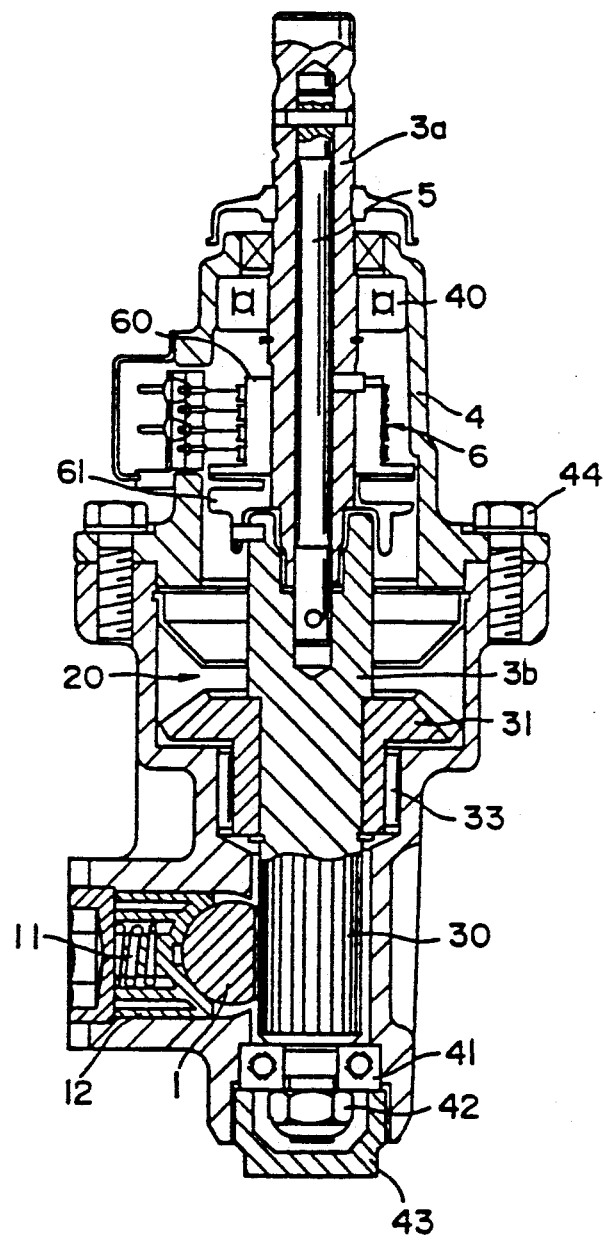
FIG. 17 is an enlarged sectional view of the same along line XVII—XVII of FIG. 16.

FIG. 16 is a partially broken front view of the third embodiment of the power steering apparatus of the invention, and FIG. 17 is an enlarged sectional view of the same cut off through XVII—XVII line shown in FIG. 16.

In this embodiment, the motor 8 and epicycle reduction gear 9 joining therewith, the electromagnetic clutch 16 and the rotary detector 17 are provided inside of the rack shaft case 2 (the torque sensor side). And the big bevel gear 31 is interposed between the pinion shaft 30 of the lower shaft 3b and the torque sensor 6. The lower shaft 3b is supported at both sides of the engagement position of the rack teeth 10 with the pinion shaft 30 by the needle roller bearing 33 outfitted at the boss portion of the big bevel gear 31 and the four-point contact ball bearing 41 outfitted at the lower part of the shaft. In this embodiment, as electrical equipments such as the motor 8, the electromagnetic clutch 16 and the like are provided at an upper portion of the rack shaft 1, the distance from the surface to the motor 8 is longer than that of the first embodiment, making this embodiment advantageous from splashed water from the surface and water covering the surface.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A power steering apparatus comprising,
  a steering mechanism for converting a rotation of a steering wheel into right and left directional movement for steering a vehicle;
  a steering position detecting means for detecting a steering position of said steering mechanism;
  a torque sensor for detecting a steering torque exerted on said steering wheel;
  a motor for assisting steering force;

a setting means for setting a driving current of said motor corresponding to the detected steering torque;

an angular velocity detecting means for detecting an angular velocity of said steering mechanism on the basis of said steering position;

an electric current setting means for setting a first current correspondingly to the detected angle velocity and steering torque;

a subtracting means for subtracting said first current from said driving current;

said electric current setting means increasing said first current correspondingly to the increase of said angular velocity, and decreasing the increasing rate of said first current correspondingly to the increase of said steering torque; and said motor being driven by the subtracted result of said subtracting means.

2. A power steering apparatus as set forth in claim 1, wherein said electric current setting means increases said first current correspondingly to the increase of said angle velocity.

3. A power steering apparatus as set forth in claim 2, wherein said electric current setting means decreases the increasing rate of said first current correspondingly to the increase of said steering torque.

4. A power steering apparatus as set forth in claim 1, further comprising a vehicle speed detecting means for detecting a speed of said vehicle, said electric current setting means increasing the increasing rate of said first current correspondingly to the detected vehicle speed.

5. A power steering apparatus as set forth in claim 1, wherein said steering position detecting means determines said steering position by the detecting of a rotary position of said motor.

6. A power steering apparatus comprising, a steering mechanism for converting a rotation of a steering wheel to movement of right-left direction for steering a vehicle;

a steering angle detecting means for detecting a steering angle of said steering mechanism;

a torque sensor for detecting a steering torque exerted on said steering wheel;

a motor for assisting steering force driven by driving current corresponding to the detected steering torque;

an angular velocity calculating means for calculating an angular velocity of said steering mechanism on the basis of the detected steering angle;

an angular velocity setting means for setting the target angular velocity on the basis of the detected steering angle and vehicle speed;

a deviation calculating means for calculating a deviation between the set target angular velocity and calculated angular velocity; and an electric current control means for controlling said driving current on the basis of the calculated result of said deviation calculating means, when the detected steering torque is within a predetermined zone.

7. A power steering apparatus as set forth in claim 6, wherein said angle velocity setting means makes the increasing rate of the target angle velocity smaller correspondingly to the increase of the vehicle speed.

8. A power steering apparatus as set forth in claim 6, wherein said angle velocity setting means makes the target angle velocity larger correspondingly to the increase of said steering angle.

9. A power steering apparatus as set forth in claim 6, wherein said electric current control means generates the driving current which becomes larger as said calculated result becomes larger.

10. A power steering apparatus as set forth in claim 6 further comprising, an electric current setting means for setting a first electric current correspondingly to the detected angle velocity and steering torque; and a subtracting means for subtracting said first current from said driving current.

11. A power steering apparatus comprising, a steering mechanism for converting a rotation of a steering wheel into right and left directional movement for steering a vehicle;

a steering position detecting means for detecting a steering position of said steering mechanism;

a torque sensor for detecting a steering torque exerted on said steering wheel;

a motor for assisting steering force driven by driving current corresponding to the detected steering torque;

an angular velocity detecting means for detecting an angular velocity of said steering mechanism on the basis of said steering position;

an electric current setting means for setting a first current correspondingly to the detected angular velocity and steering torque, wherein said electric current setting means increases said first current correspondingly to the increase of said angular velocity, and wherein said electric current setting means decreases the increasing rate of said first current correspondingly to the increase of said steering torque; and a subtracting means for subtracting said first current from said driving current.

12. A power steering apparatus comprising:

a steering mechanism for converting a rotation of a steering wheel into right and left directional movement for steering a vehicle;

a steering position detecting means for detecting a steering position of said steering mechanism;

a torque sensor for detecting a steering torque exerted on said steering wheel;

a motor for assisting steering force, the motor being driven by a driving current corresponding to the detected steering torque;

an angular velocity detecting means for detecting an angular velocity of said steering wheel on the basis of said steering position;

an electric current setting means for setting a first current corresponding to said detected angular velocity and said steering torque, wherein said first current increases in response to an increase of said angular velocity, and wherein a rate of increase of said first current decreases in response to an increase of said torque; and current modifying means for modifying said driving current in response to said first current.

* * * * *

UNITED STATES PATENT AND TRADEMARK OFFICE
CERTIFICATE OF CORRECTION

PATENT NO. : 5,076,381
DATED : 12/31/91
INVENTOR(S) : DAIDO, et al

It is certified that error appears in the above-identified patent and that said Letters Patent is hereby corrected as shown below:

Title page:

In the assignment data:

"Mitsubishi Denki Kabushiki Kaisha, Tokyo, Japan"

should be

--Koyo Seiko Co., Ltd., Osaka, Japan--

Signed and Sealed this

Twenty-third Day of June, 1992

*Attest:*

DOUGLAS B. COMER

*Attesting Officer*   *Acting Commissioner of Patents and Trademarks*